US012536204B2

(12) United States Patent
Tian et al.

(10) Patent No.: US 12,536,204 B2
(45) Date of Patent: Jan. 27, 2026

(54) MULTI-SUBGRAPH MATCHING METHOD AND APPARATUS, AND DEVICE

(71) Applicants: HUAWEI TECHNOLOGIES CO., LTD., Shenzhen (CN); Fudan University, Shanghai (CN)

(72) Inventors: Zhen Tian, Shanghai (CN); Weiguo Zheng, Shanghai (CN); Junhua Zhu, Hangzhou (CN)

(73) Assignees: Huawei Technologies Co., Ltd., Shenzhen (CN); Fudan University, Shanghai (CN)

( * ) Notice: Subject to any disclaimer, the term of this patent is extended or adjusted under 35 U.S.C. 154(b) by 168 days.

(21) Appl. No.: 18/520,127

(22) Filed: Nov. 27, 2023

(65) Prior Publication Data

US 2024/0095260 A1 Mar. 21, 2024

Related U.S. Application Data

(63) Continuation of application No. PCT/CN2022/095023, filed on May 25, 2022.

(30) Foreign Application Priority Data

May 27, 2021 (CN) .......................... 202110585942.0

(51) Int. Cl.
*G06F 16/28* (2019.01)
*G06F 16/245* (2019.01)

(52) U.S. Cl.
CPC .......... *G06F 16/287* (2019.01); *G06F 16/245* (2019.01)

(58) Field of Classification Search
CPC ............... G06F 16/287; G06F 16/9024; G06F 16/24535; G06F 16/24556; G06F 16/24558; G06F 16/28
See application file for complete search history.

(56) References Cited

U.S. PATENT DOCUMENTS

| 6,556,983 B1 * | 4/2003 | Altschuler ............ G06F 16/907 707/E17.011 |
| 2007/0226248 A1 * | 9/2007 | Darr ...................... H04L 67/535 707/999.102 |

(Continued)

FOREIGN PATENT DOCUMENTS

| CN | 109614520 A | 4/2019 |
| CN | 110321347 A | 10/2019 |

*Primary Examiner* — Etienne P Leroux
(74) *Attorney, Agent, or Firm* — Leydig, Voit & Mayer, Ltd.

(57) ABSTRACT

A multi-subgraph matching method and apparatus, and a device are provided. After receiving a plurality of query graphs, the multi-subgraph matching apparatus groups the plurality of query graphs based on a hash value of each query graph, to generate a plurality of groups of query graphs. A plurality of query graphs whose hash values fall within a same value range belong to a same group. Then, the multi-subgraph matching apparatus respectively matches the plurality of groups of query graphs with a data graph in parallel, to obtain matching results. The matching results are matching results between the plurality of query graphs and the data graph. According to the multi-subgraph matching method in this application, grouping efficiency can be increased, and subgraph matching efficiency can be effectively increased.

17 Claims, 9 Drawing Sheets

(56) References Cited

U.S. PATENT DOCUMENTS

| | | | | |
|---|---|---|---|---|
| 2015/0269224 A1* | 9/2015 | Kundu | ............. | G06F 16/24542 707/718 |
| 2018/0004751 A1* | 1/2018 | Vikhe | .................. | G06F 16/248 |

* cited by examiner

MULTI-SUBGRAPH MATCHING METHOD AND APPARATUS, AND DEVICE

CROSS-REFERENCE TO RELATED APPLICATIONS

This application is a continuation of International Application No. PCT/CN2022/095023, filed on May 25, 2022, which claims priority to Chinese Patent Application No. 202110585942.0, filed on May 27, 2021. The disclosures of the aforementioned applications are hereby incorporated by reference in their entireties.

TECHNICAL FIELD

This application relates to the field of graph computing technologies, and in particular, to a multi-subgraph matching method and apparatus, and a device.

BACKGROUND

Graph data can represent a relationship between things in a real world, for example, a social network, a transportation network, and a biological network. The graph data can be used to implement in-depth research on the relationship between things. For example, in the social network, graph data may be used to search for another possible suspect whose social network graph overlaps a social network graph of a known criminal. In biology, graph data may be used to search for a relationship between a predator and prey.

A subgraph query is to search the data graph for a subgraph that is of a data graph and that matches the query graph (that is, the same as the query graph). Currently, a single-subgraph query, a manner is mature. After receiving a single query graph, the data graph is searched for a node in the query graph, and an irrelevant node in the data graph is filtered out. A breadth first search (BFS) policy is used to select a vertex from the query graph as a root node, and then the remaining nodes in the query graph are traversed layer by layer, to determine a node matching sequence of the query graph. The query graph is matched, in the node matching sequence, with the data graph whose irrelevant node is filtered out, and a subgraph that matches the query graph is determined from the data graph.

However, in actual application, when a subgraph query is performed, a plurality of query graphs usually need to be received. If a single-subgraph query is performed for each query graph in the foregoing manner, a subgraph query speed is low, and efficiency is low.

SUMMARY

This application provides a multi-subgraph matching method and apparatus, and a device, to increase subgraph matching efficiency for a plurality of query graphs.

According to a first aspect, an embodiment of this application provides a multi-subgraph matching method. The method may be performed by a multi-subgraph matching apparatus, or may be performed by apparatuses in a multi-subgraph matching system through cooperation. An example in which the multi-subgraph matching apparatus performs the method is used for description herein. A manner in which the apparatuses in the multi-subgraph matching system perform the method through cooperation is similar to a manner in which the multi-subgraph matching apparatus performs the method. A difference lies in that when the apparatuses in the multi-subgraph matching system perform the method through cooperation, one apparatus is configured to complete a part of the method, and the apparatuses may exchange data. In this embodiment of this application, multi-subgraph matching is subgraph matching for a plurality of query graphs.

In the method, the multi-subgraph matching apparatus may first receive a plurality of query graphs. Each of the plurality of query graphs represents a plurality of nodes and a connection relationship between the nodes. After receiving the plurality of query graphs, the multi-subgraph matching apparatus may group the plurality of query graphs. For example, the multi-subgraph matching apparatus may group the plurality of query graphs based on a hash value of each query graph, to generate a plurality of groups of query graphs. A plurality of query graphs whose hash values fall within a same value range belong to a same group. Then, the multi-subgraph matching apparatus can respectively match the plurality of groups of query graphs with the data graph in parallel, to obtain matching results. The matching results are matching results between the plurality of query graphs and the data graph.

In the method, the plurality of query graphs are grouped, to obtain the plurality of groups of query graphs, and then subgraph matching is performed between the plurality of groups of query graphs and the data graph in parallel, to effectively increase subgraph matching efficiency. The plurality of query graphs are grouped based on the hash value, to increase grouping efficiency, and ensure that overall subgraph matching is efficient.

In an embodiment, when the plurality of query graphs are grouped, the multi-subgraph matching apparatus may further consider load balancing of the query graphs, so that query costs of all of the plurality of groups of query graphs fall within a same range, and the query cost indicates a workload consumed when matching is performed on a plurality of query graphs that belong to a same group.

In the method, the query costs of all of the plurality of groups of query graphs fall within a same range, so that when the plurality of groups of query graphs are matched with the data graph in parallel, workloads consumed when all the groups of query graphs are matched with the data graph are approximately the same or close, and matching results between all the groups of query graphs and the data graph can be obtained at a same time or within a same time range as much as possible, to achieve a load balancing effect.

In an embodiment, when the multi-subgraph matching apparatus respectively matches the plurality of groups of query graphs with the data graph in parallel, to obtain the matching results, the multi-subgraph matching apparatus may further divide the data graph, to generate a plurality of data subgraphs; and then execute a plurality of matching tasks in parallel. Each matching task is used to match one of the plurality of data subgraphs with one of the plurality of groups of query graphs.

According to the method, division into data subgraphs can further reduce an invalid matching operation that may exist in a process of matching one group of queries with the data graph, to ensure that multi-subgraph matching is efficient.

In an embodiment, for a data subgraph in a matching task, the data subgraph includes nodes of all query graphs in a group of query graphs in the matching task. In other words, the plurality of matching tasks include a first matching task, the first matching task is used to match a first data subgraph with a first group of query graphs in the plurality of groups of query graphs, and the first data subgraph includes nodes of all query graphs in the first group of query graphs.

In the method, a data subgraph in a matching task includes nodes of all query graphs in a group of query graphs in the matching task, so that a success rate of matching the data subgraph with the group of query graphs can be increased, to increase a possibility that a subgraph that matches a query graph in the group of query graphs can be obtained from the data subgraph, and ensure multi-subgraph matching accuracy.

In an embodiment, execution of the first matching task is used as an example to describe a matching task execution manner. When the first matching task is executed, a task subgraph of each query graph in the first group of query graphs may be determined from the first data subgraph. The task subgraph of the query graph includes all nodes of the query graph. In this embodiment of this application, the plurality of query graphs may correspond to one task subgraph, and the task subgraph includes all nodes of the plurality of corresponding query graphs. One query graph may alternatively correspond to only one task subgraph, and the task subgraph includes all results of the corresponding query graph. After the task subgraph of each query graph is determined, the multi-subgraph matching apparatus may match the task subgraph of each query graph with a common subgraph. The common subgraph is a common part included in each query graph in the first group of query graphs. When matching between a task subgraph of any query graph and the common subgraph succeeds, the multi-subgraph matching apparatus may match the task subgraph of the query graph with a part of the query graph other than the common subgraph, to obtain a matching result between the task subgraph of the query graph and the query graph.

In the method, the task subgraph of the query graph is first matched with the common subgraph of the group of query graphs, and is matched with the remaining part of the query graph after matching succeeds. In other words, after matching between the task subgraph of the query graph and the common subgraph of the group of query graphs fails, a subsequent action does not need to be performed, to increase efficiency. In addition, when the plurality of query graphs correspond to a same task subgraph, the task subgraph needs to be matched only once with the common subgraph of the group of query graphs, and an operation of performing matching with the common subgraph of the group of query graphs does not need to be performed once for each of the plurality of query graphs, to reduce a redundant matching operation and increase matching efficiency.

In an embodiment, when matching between the task subgraph of the query graph and the common subgraph fails, the multi-subgraph matching apparatus may directly determine that a matching result is that matching fails. In other words, a subgraph that matches the query graph does not exist in the first data subgraph. Further, the subgraph that matches the query graph does not exist in the data graph.

In the method, when matching between the task subgraph of the query graph and the common subgraph fails, the matching result is directly obtained, and efficiency is high.

In an embodiment, the hash value of each query graph is obtained based on an LSH.

According to the method, an LSH function has a high speed and low complexity. When the LSH function is used to group the query graphs, a grouping speed can be accelerated, and further, subgraph matching efficiency can be increased.

According to a second aspect, an embodiment of this application further provides a multi-subgraph matching apparatus. The multi-subgraph matching apparatus has functions of implementing behaviors in the method example in the first aspect. For beneficial effects, refer to the descriptions in the first aspect. Details are not described herein again. The functions may be implemented by hardware, or may be implemented by executing corresponding software by hardware. The hardware or software includes one or more modules corresponding to the functions. In a possible design, a structure of the apparatus includes a receiving module, a grouping module, and a matching module. These modules may perform the corresponding functions in the method example in the first aspect. For details, refer to detailed descriptions in the method example. Details are not described herein again.

According to a third aspect, an embodiment of this application further provides a multi-subgraph matching system. The multi-subgraph matching system includes a control apparatus and a plurality of matching apparatuses. The control apparatus and the plurality of matching apparatuses can cooperate to implement the method performed by the multi-subgraph matching apparatus in the method example in the first aspect. For beneficial effects, refer to the descriptions in the first aspect. Details are not described herein again.

The control apparatus is configured to: receive a plurality of query graphs, where each of the plurality of query graphs represents a plurality of nodes and a connection relationship between the nodes; and group the plurality of query graphs based on a hash value of each query graph, to generate a plurality of groups of query graphs, where a plurality of query graphs whose hash values fall within a same value range belong to a same group.

The plurality of matching apparatuses are configured to respectively match the plurality of groups of query graphs with a data graph in parallel, to obtain matching results. One matching apparatus is configured to match one the plurality of groups of query graphs with the data graph in parallel, to obtain matching results.

In an embodiment, query costs of all of the plurality of groups of query graphs fall within a same range, and the query cost indicates a workload consumed when matching is performed on a plurality of query graphs that belong to a same group.

In an embodiment, the control apparatus may further divide the data graph, to generate a plurality of data subgraphs; and each matching apparatus may obtain one data subgraph. The plurality of matching apparatuses may execute a plurality of matching tasks in parallel. One matching apparatus executes one matching task. Each matching task is used to match one of the plurality of data subgraphs with one of the plurality of groups of query graphs, and one matching apparatus is configured to execute one matching task.

In an embodiment, the plurality of matching tasks include a first matching task, the first matching task is used to match a first data subgraph with a first group of query graphs in the plurality of groups of query graphs, and the first data subgraph includes nodes of all query graphs in the first group of query graphs.

In an embodiment, when executing the first matching task, the matching apparatus may determine a task subgraph of each query graph in the first group of query graphs from the first data subgraph. The task subgraph of the query graph includes all nodes of the query graph.

The task subgraph of each query graph is matched with a common subgraph. The common subgraph is a common part included in each query graph in the first group of query graphs.

When matching between a task subgraph of any query graph and the common subgraph succeeds, the task subgraph of the query graph is matched with a part of the query graph other than the common subgraph, to obtain a matching result between the task subgraph of the query graph and the query graph.

In an embodiment, if matching between the task subgraph of the query graph and the common subgraph fails, the matching apparatus may further determine that a subgraph that matches the query graph does not exist in the first data subgraph. In other words, the matching result between the task subgraph of the query graph and the query graph is obtained.

In an embodiment, the hash value of each query graph is obtained based on an LSH.

According to a fourth aspect, this application further provides a computing device. The computing device includes a processor and a memory, and may further include a communication interface. The processor executes program instructions in the memory, to perform the method provided in any one of the first aspect or the embodiments of the first aspect. The memory is coupled to the processor, and stores program instructions and data that are necessary in a multi-subgraph matching process. The communication interface is configured to communicate with another device, for example, obtain a plurality of query graphs and send a matching result.

According to a fifth aspect, this application provides a computing device system. The computing device system includes at least one computing device. Each computing device includes a memory and a processor. The processor in the at least one computing device is configured to access code in the memory, to perform the method provided in any one of the first aspect or the embodiments of the first aspect.

According to a sixth aspect, this application provides a non-transient readable storage medium. When the non-transient readable storage medium is executed by a computing device, the computing device performs the method provided in any one of the first aspect or the embodiments of the first aspect. The storage medium stores a program. The storage medium includes but is not limited to a volatile memory, for example, a random access memory, or a non-volatile memory, for example, a flash memory, a hard disk drive (HDD), and a solid state drive (SSD).

According to a seventh aspect, this application provides a computing device program product. The computing device program product includes computer instructions. When the computer instructions are executed by a computing device, the computing device is enabled to perform the method provided in any one of the first aspect or the embodiments of the first aspect. The computing device program product may be a software installation package. When the method provided in any one of the first aspect or the embodiments of the first aspect needs to be used, the computing device program product may be downloaded and executed by the computing device.

DESCRIPTION OF EMBODIMENTS

Before a multi-subgraph matching method provided in embodiments of this application is described, related concepts in embodiments of this application are first explained.

(1) Graph and Node

The graph is a data structure including a node and an edge. The graph may represent objects in different fields and a relationship between the objects. A social network is used as an example. The node in the graph may represent a person in the social network, and the edge in the graph may represent a relationship between persons in the social network.

To distinguish between nodes in the graph, an identifier may be configured for the node, and the identifier may uniquely represent the node in the graph. A label may be configured for the node based on an attribute of an object represented by the node. A graph representing the social network is still used as an example. A label of a node in the graph may be information such as a position, a company, or an age of a person represented by the node. In the graph, an identifier of the node is unique, and the label of the node may be repeated.

When an edge exists between two nodes in the graph, it indicates that the two nodes have a connection relationship, and the two nodes are neighboring nodes of each other. In different fields, the edge represents different meanings. For example, in the graph representing the social network, the edge indicates that a relationship exists between persons represented by the two nodes. For example, in a graph representing a transportation network, the edge indicates that a road exists between intersections represented by the two nodes.

(2) Query Graph and Data Graph

Subgraph matching is to search for a subgraph that is in a graph B and that is the same as a graph A. To distinguish between the graph A and the graph B, the graph A is referred to as a query graph, and the graph B is referred to as a data graph.

(3) And/Or

"And/or" includes three relationships. "A and/or B" is used as an example. "A and/or B" includes A, B, and A and B.

Figure 1:
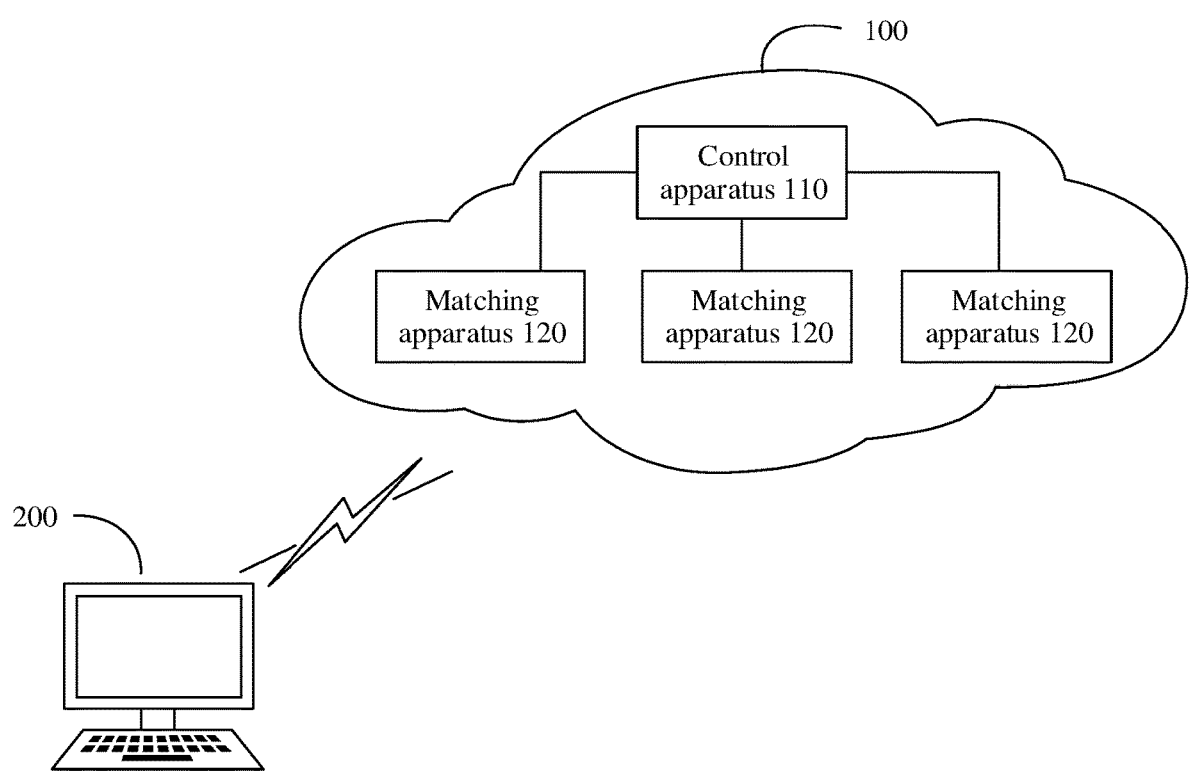
FIG. 1 is a schematic diagram of an architecture of a system according to this application.

FIG. 1 is a schematic diagram of an architecture of a system according to an embodiment of this application. The system includes a matching system 100 and a client 200. The client 200 is deployed on a user side. A user may transmit a plurality of query graphs to the client 200, and trigger the client 200 to initiate a subgraph matching request to the matching system 100, to request the matching system 100 to perform matching for the plurality of query graphs.

A specific form of the client 200 is not limited in this embodiment of this application. The client 200 may be a computing device deployed on the user side, or may be an application installed on a computing device of the user.

The matching system 100 can receive the subgraph matching request from the client 200, and perform a subgraph matching method provided in embodiments of this application. After obtaining matching results of the plurality of query graphs, the matching system 100 may further feed back the matching results of the plurality of query graphs to the client 200.

For example, in the matching system 100, the matching system 100 includes a control apparatus 110 and a plurality of matching apparatuses 120. Deployment locations of the control apparatus 110 and the matching apparatus 120 are not limited in this embodiment of this application. For example, the control apparatus 110 or the matching apparatus 120 may be deployed in an edge data center, may be deployed in a cloud data center, or may be deployed on a computing device. When the control apparatus 110 and any matching apparatus 120 are deployed at different locations, the matching system 100 may be a system deployed in a distributed manner. When the control apparatus 110 and the plurality of matching apparatuses 120 are deployed at a same location, the matching system 100 may be a system deployed in a centralized manner.

Figure 2:
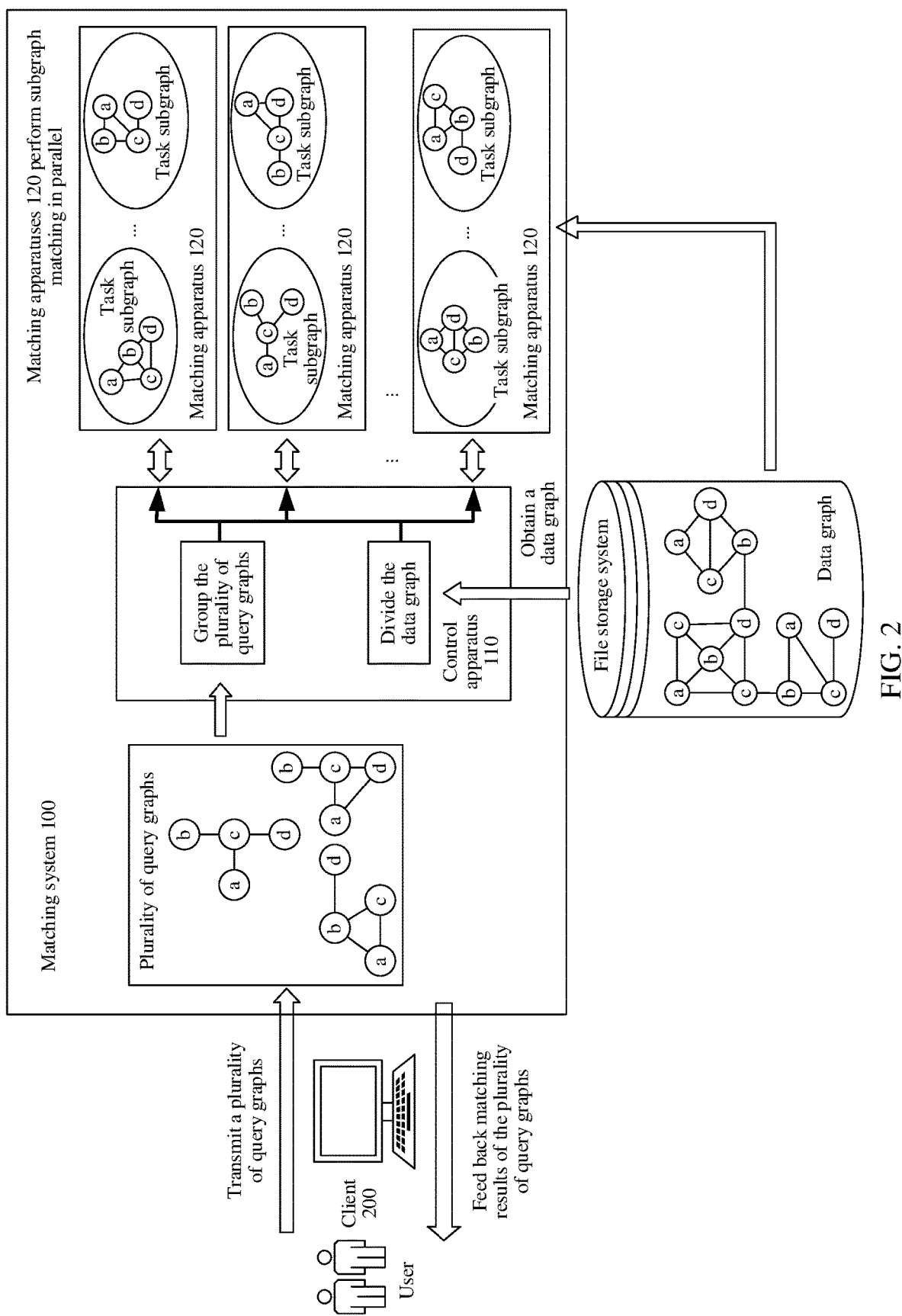
FIG. 2 is a flowchart in which a control apparatus and a matching apparatus cooperate to perform multi-subgraph matching according to this application.

As shown in FIG. 2, in this embodiment of this application, the control apparatus 110 can group the plurality of query graphs into a plurality of groups of query graphs, and may send the plurality of groups of query graphs to each matching apparatus 120. The control apparatus 110 may further obtain a data graph (for example, obtain data from a file storage system), divide the data graph into a plurality of data subgraphs, and send the plurality of data subgraphs to the matching apparatus 120 by group. One matching apparatus 120 obtains some or all of the plurality of data subgraphs. Each matching apparatus 120 may perform a subgraph matching operation of one group of query graphs. To be specific, each matching apparatus 120 may perform subgraph matching on the group of query graphs based on an obtained data subgraph, to obtain matching results of the group of query graphs, and feed back the matching results to the control apparatus 110.

In this embodiment of this application, specific forms of the control apparatus 110 and the matching apparatus 120 are not limited. The control apparatus 110 is used as an example. The control apparatus 110 may be an entity apparatus, for example, may be a computing device or a component in the computing device. The control apparatus 110 may alternatively be a software apparatus, for example, may be an application such as a virtual machine or a container deployed on a computing device. The matching apparatus 120 is similar.

It should be noted that, FIG. 1 shows only an example of a system architecture to which embodiments of this application are applicable. In some possible scenarios, the subgraph matching method provided in embodiments of this application may also be performed by a computing device (for example, a multi-subgraph matching apparatus). A process in which the computing device performs the subgraph matching method is similar to a process in which the matching system 100 performs the subgraph matching method. Operations performed by the control apparatus and the matching apparatus may be performed by a thread in the computing device. The computing device may include a plurality of threads. One thread may perform an operation or a method performed by the control apparatus, and the remaining threads may perform an operation or a method performed by the plurality of matching apparatuses.

Figure 3:
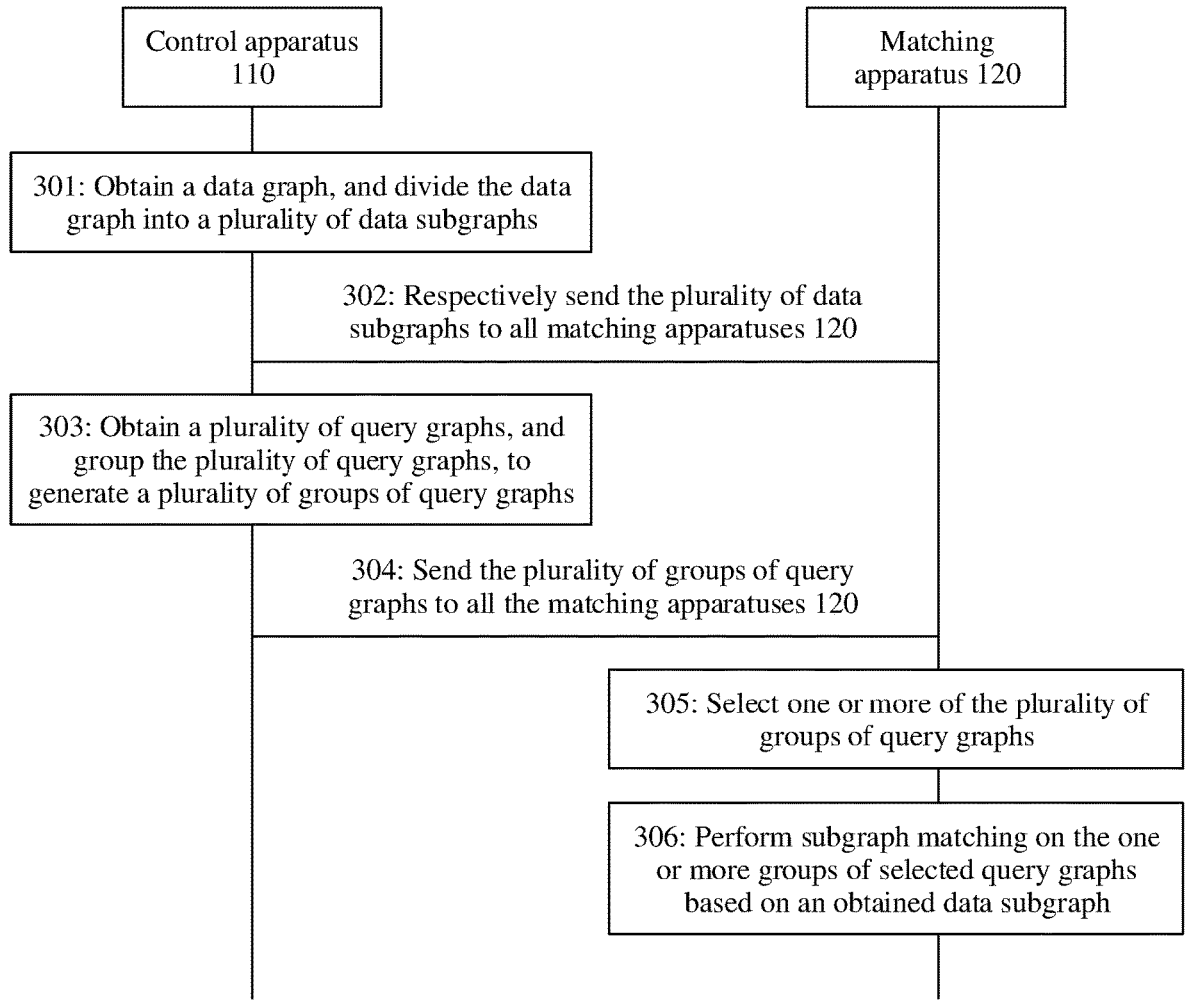
FIG. 3 is a schematic diagram of a multi-subgraph matching method according to this application.

The following describes, by using the architecture shown in FIG. 1 as an example, a subgraph matching method provided in an embodiment of this application. Refer to FIG. 3. The method includes the following steps.

Step 301: A control apparatus 110 obtains a data graph, and divides the data graph into a plurality of data subgraphs.

A manner in which the control apparatus 110 obtains the data graph is not limited in this embodiment of this application. For example, the data graph may be sent by a user to the control apparatus 110 by using a client 200, and the control apparatus 110 may receive the data graph from the client 200. After receiving the data graph, the control apparatus 110 may directly perform step 301, or may perform step 301 when subsequently receiving a plurality of query graphs.

For another example, the data graph may be preconfigured in the control apparatus 110. When the control apparatus 110 determines that the data graph needs to be divided or subgraph matching needs to be performed (for example, the control apparatus 110 receives an instruction triggered by the user by using the client, for example, an instruction for instructing to perform division into data subgraphs, or an instruction for instructing to perform subgraph matching on the plurality of query graphs), the control apparatus 110 performs step 301.

For another example, the data graph may be stored in a file storage system. When determining that subgraph matching needs to be performed or the data graph needs to be divided, the control apparatus 110 may obtain the data graph from the file storage system, and divide the data graph after obtaining the data graph.

The control apparatus 110 divides the data graph in a plurality of manners. For example, the control apparatus 110 may divide the data graph into a plurality of data subgraphs of a same size. For another example, the control apparatus 110 may aggregate, into one data subgraph based on nodes in the data graph and a connection relationship between the nodes, parts with a high structural similarity (for example, the structural similarity is higher than a threshold), to form a plurality of data subgraphs. In all the data subgraphs, nodes and connection relationships between the nodes are similar.

For another example, the control apparatus 110 may alternatively divide the data graph based on a hash algorithm. The control apparatus 110 may traverse nodes of the data graph. Each time a node is traversed (for example, an identifier and a label of the node are obtained), the node is input into the hash algorithm (for example, the identifier or the label of the node is input into the hash algorithm). An output value of the hash algorithm identifies a partition of the node, and nodes belonging to a same partition form a data subgraph. When there are a plurality of partitions, the data graph forms a plurality of data subgraphs.

Figure 4:
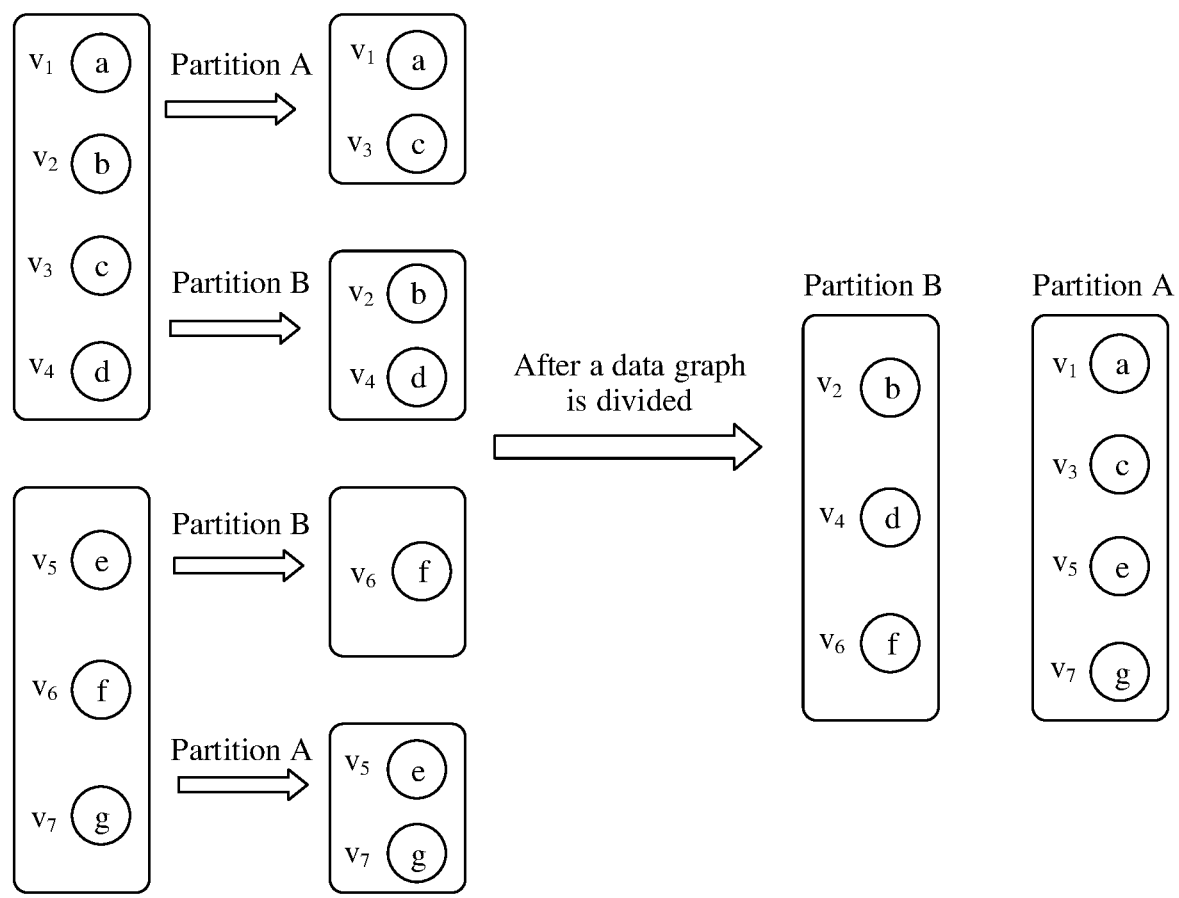
FIG. 4 is a schematic diagram of dividing a data graph according to this application.

FIG. 4 shows a data graph division method according to an embodiment of this application. FIG. 4 shows an example of seven nodes in the data graph. The seven nodes are $v_1$, $v_2$, $v_3$, $v_4$, $v_5$, $v_6$, and $v_7$. The control apparatus 110 groups $v_1$, $v_2$, $v_3$, and $v_4$ into two partitions based on the hash algorithm. Herein, $v_1$ and $v_3$ are in a partition A, and $v_2$ and $v_4$ are in another partition B. The control apparatus 110 groups $v_5$, $v_6$, and $v_7$ into two partitions based on the hash algorithm. Herein, $v_5$ and $v_7$ are in the partition A, and $v_6$ are in the another partition B. Herein, $v_1$, $v_3$, $v_5$, and $v_7$ that belong to the partition A form a data subgraph; and $v_2$, $v_4$, and $v_6$ that belong to the partition B form a data subgraph.

Step 302: The control apparatus 110 respectively sends the plurality of data subgraphs to all matching apparatuses 120, where each matching apparatus 120 obtains one data subgraph.

After dividing the data graph into the plurality of data subgraphs, the control apparatus 110 may send one data subgraph to each matching apparatus 120.

For example, the control apparatus 110 may send information about the data subgraph to the matching apparatus 120. The information about the data subgraph may include an identifier of a node, a label of the node, and a set (a neighboring node set of the node may record an identifier and a label of a neighboring node of the node).

For another example, the control apparatus 110 may send a storage address of the data subgraph (for example, a storage address of the data subgraph in the control apparatus 110 or the file storage system) to the matching apparatus 120. After obtaining the storage address of the data subgraph, the matching apparatus 120 may obtain the data subgraph based on the storage address of the data subgraph.

It should be noted that, in an actual application (for example, when a size of the data graph is small), the control apparatus 110 may not perform step 301 and step 302. After obtaining the data graph, the control apparatus 110 may directly send the data graph to each matching apparatus 120. Certainly, in another possible scenario, the control apparatus 110 may not obtain the data graph, but the matching apparatus 120 independently obtains the data graph.

Step 303: The control apparatus 110 obtains the plurality of query graphs, and groups the plurality of query graphs, to generate a plurality of groups of query graphs.

The user may send the plurality of query graphs to the control apparatus 110 by using the client 200. For example, the user may send a subgraph matching request to the control apparatus 110 by using the client 200. The subgraph matching request carries the plurality of query graphs, and is used to request to perform subgraph matching on the plurality of query graphs.

After obtaining the plurality of query graphs, the control apparatus 110 may group the plurality of query graphs. In step 303, grouping the plurality of query graphs aims to group query graphs with a high structural similarity into one group. That the query graphs have a high structural similarity may also be understood as that the query graphs have a same common subgraph.

To increase query graph grouping efficiency, the control apparatus 110 may group the plurality of query graphs based on a locality-sensitive hash (LSH) function.

For example, the LSH function is a min-hash function. For any one of the plurality of query graphs, the control apparatus 110 may perform the min-hash function on a node set (the node set records a label and an identifier of each node) of the query graph. An output value of the min-hash function is a number of a group to which the query graph belongs. The control apparatus 110 performs the min-hash function on a node set of each query graph, to determine a number of a group to which each query graph belongs.

Because the LSH function has advantages of a high speed and low complexity, when the LSH function is used to group the query graphs, a grouping speed can be greatly accelerated, and further, subgraph matching efficiency can be increased.

Figure 5:
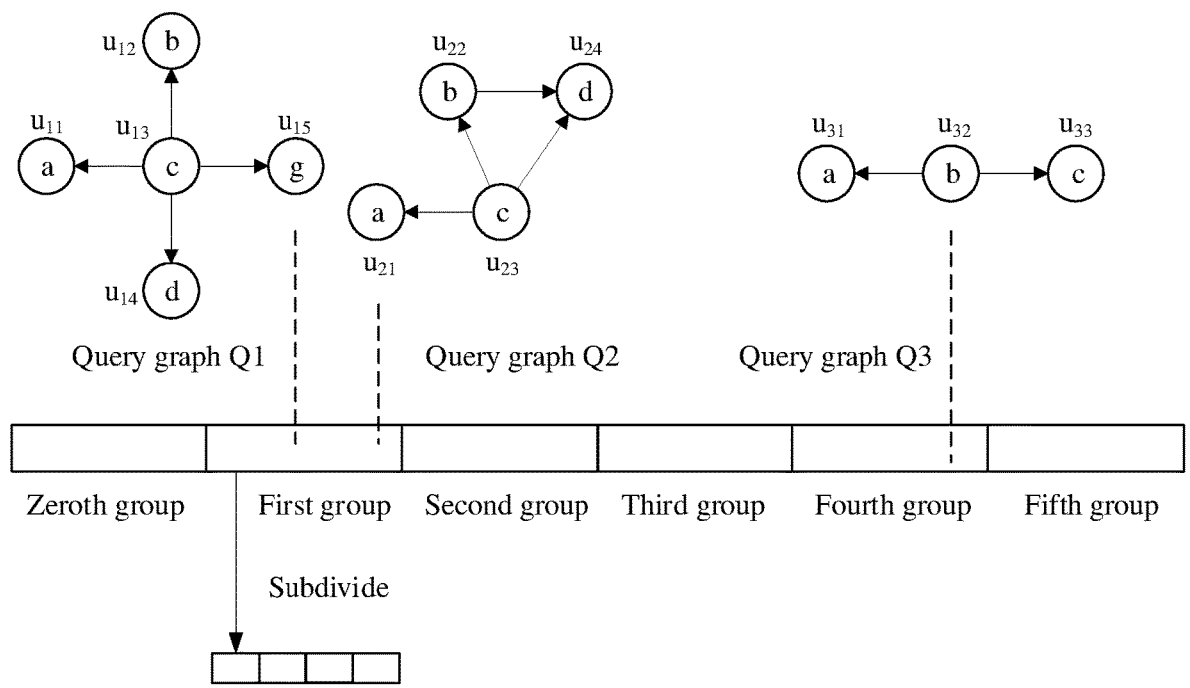
FIG. 5 is a schematic diagram of grouping a plurality of query graphs according to this application.

FIG. 5 is a schematic diagram of grouping a plurality of query graphs according to an embodiment of this application. In FIG. 5, only three query graphs are drawn as an example. The three query graphs are a query graph Q1, a query graph Q2, and a query graph Q3. The query graph Q1 and the query graph Q2 are in a first group, and the query graph Q3 is in a fourth group.

When the plurality of query graphs are grouped based on an LSH algorithm, each group may include a different quantity of query graphs. In other words, a quantity of query graphs in one group of query graphs is large, and a quantity of query graphs in another group of query graphs is small. When a quantity of query graphs in a group is large, for example, the quantity of query graphs has exceeded a specified value, the control apparatus 110 may further divide the group of query graphs, that is, subdivide the group of query graphs into a plurality of groups of query graphs. A manner of further dividing the group of query graphs is not limited herein. The group of query graphs may be further divided in a manner of grouping the plurality of query graphs, or the group of query graphs may be further divided in another manner.

For example, the control apparatus 110 may calculate a query cost of each query graph. A query cost of one query graph may represent a workload consumed when subgraph matching is performed on the query graph. A manner of measuring the workload is not limited in this embodiment of this application. For example, the workload may be measured based on a quantity of edges or nodes of the query graph, a time period consumed by performing subgraph matching on the query graph, or the like.

When further dividing the group of query graphs, the control apparatus 110 may divide the group of query graphs into a plurality of groups based on a load balancing policy with reference to a query cost of each query graph in the group of query graphs. Sums of query costs of query graphs in all groups obtained after the group of query graphs is divided are equal, or a difference between sums of query costs of query graphs in any two groups is small (for example, the difference is less than a threshold). That is, a sum of query costs of query graphs in each group falls within a same range. After one or more groups of query graphs are further divided, a plurality of groups of query graphs may be finally obtained (the plurality of groups of query graphs include one or more groups of query graphs that are not further divided), and query costs of all of the finally obtained plurality of groups of query graphs fall within a same range. In this way, it can be ensured that workloads consumed when the matching apparatus 120 subsequently performs subgraph matching on query graphs in all groups are approximately the same.

A manner of calculating the query cost of the query graph is not limited in this embodiment of this application. One of manners of calculating the query cost of the query graph is listed herein.

First, the control apparatus 110 converts each edge in the data graph into a two-column table (e.g., the table is a database table). One edge corresponds to one row in the table, each row includes two elements, and the two elements respectively represent two nodes connected to the edge. The query graph is decomposed into a multi-path connection operation of a database, and the query cost of the query graph may be approximately represented by a multi-path connection cost of the database.

A formula of calculation performed based on the connection cost T(RNS) of the database is as follows:

$$(RNS)=(R)T(S)/\max(V(R,Y),V(S,Y))$$

(R) is a tuple number of a relationship R, and (R,Y) is a quantity of different values of an attribute Y in the relationship R.

After the plurality of query graphs are grouped, the control apparatus 110 may perform step 304.

Step 304: The control apparatus 110 sends a grouping result to each matching apparatus 120, where each matching apparatus 120 obtains the plurality of groups of query graphs. The grouping result includes the plurality of query graphs and a group to which each query graph belongs.

After receiving the plurality of groups of query graphs, any matching apparatus 120 may perform step 305 and step 306. The plurality of matching apparatuses 120 may run in parallel. In other words, the plurality of matching apparatuses 120 may simultaneously perform step 305 and step 306. According to a manner in which the plurality of matching apparatuses 120 run in parallel, a subgraph matching process can be further accelerated, and it is ensured that a subgraph matching result can be obtained quickly. Herein, one of the matching apparatuses 120 is used as an example to describe a case in which the matching apparatus 120 performs step 305 and step 306.

Step 305: After receiving the plurality of groups of query graphs, the matching apparatus 120 selects one or more of the plurality of groups of query graphs.

After receiving the plurality of groups of query graphs, the matching apparatus 120 may select one or more groups of query graphs from the plurality of groups of query graphs, to perform subgraph matching. Because each matching apparatus 120 has obtained one data subgraph, when selecting one or more groups of query graphs, the matching apparatus 120 may select the one or more groups of query graphs based on the obtained data subgraph.

For example, nodes in the data subgraph obtained by the matching apparatus 120 include nodes in any query graph in the one or more groups of selected query graphs. Specifically, the matching apparatus 120 may determine a node set of each of the plurality of groups of query graphs. The node set of each group of query graphs is a union set of node sets of all query graphs in the group of query graphs (a repeated node in all the query graphs in the group of query graphs may appear only once in the set of the group of query graphs). When it is determined that a node set of the data graph includes the node set of the group of query graphs, the group of query graphs is selected; or when it is determined that a node set of the data graph does not include the node set of the group of query graphs, the group of query graphs is not selected. In this manner, the one or more groups of query graphs selected by the matching apparatus 120 have a large quantity of nodes the same as those of the obtained data subgraph, and the one or more groups of selected query graphs have a high similarity to the obtained data subgraph, to further ensure a success rate of subsequent subgraph matching.

After selecting the one or more groups of query graphs, the matching apparatus 120 may perform step 306. Certainly, in some scenarios (for example, a scenario in which each group of query graphs includes a large quantity of nodes), the matching apparatus 120 receives the plurality of groups of query graphs, and the matching apparatus 120 may not perform step 305, but matches each group of query graphs with the obtained data subgraph. The matching apparatus 120 may create a plurality of threads. Each thread matches one group of query graphs with the obtained data subgraph.

Step 306: The plurality of matching apparatuses 120 may execute a plurality of matching tasks in parallel, where each matching apparatus 120 executes one matching task, and the matching task executed by each matching apparatus is to perform subgraph matching on the one or more groups of selected query graphs based on the obtained data subgraph.

In step 306, each matching apparatus 120 performs subgraph matching on any group of selected query graphs based on the obtained data subgraph in a same manner. Herein, that one matching apparatus 120 performs subgraph matching on one group of query graphs based on the obtained data subgraph is used as an example for description.

Step 1: For any query graph in the group of query graphs, the matching apparatus 120 may first configure a node matching plan of the query graph, where the node matching plan of the query graph indicates a node matching sequence of the query graph. First, the matching apparatus 120 selects, as a root node from the query graph, a node whose label appears for a small quantity of times and that has a large degree (the degree is a quantity of neighboring nodes of the node). Then, from the root node, the query graph is traversed based on a breadth first search (BFS), to obtain a level order of the query graph. Nodes of the query graph are layered based on the level order of the query graph. Then, the matching apparatus 120 sorts the nodes in the query graph based on the level order of the query graph, to generate the node matching plan of the query graph.

Figure 6:
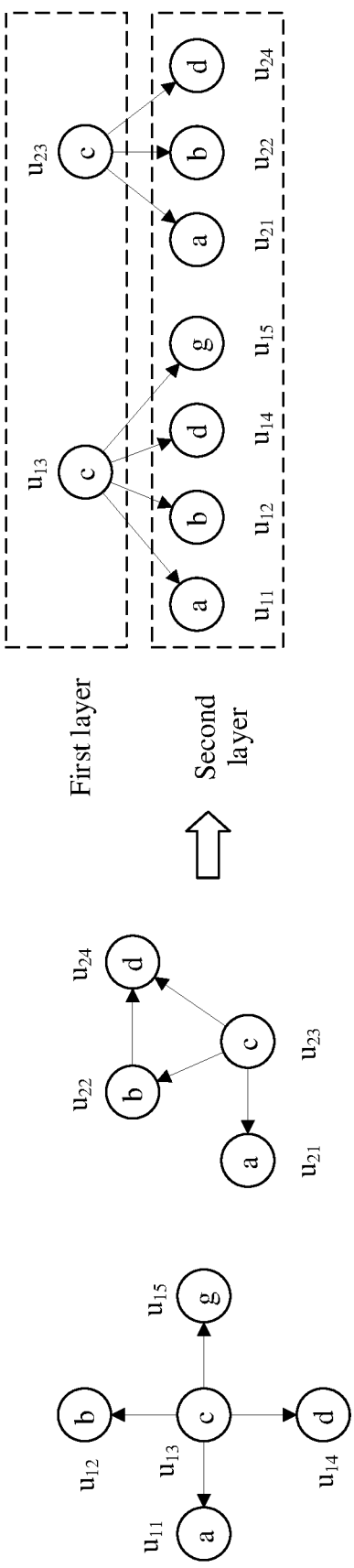
FIG. 6 is a schematic diagram of a query graph matching plan according to this application.

FIG. 6 shows two query graphs. The two query graphs are a query graph Q1 and a query graph Q2. In the query graph Q1, $u_{13}$ is selected as a root node. In the query graph Q2, $u_{23}$ is selected as a root node.

After the query graph Q1 and the query graph Q2 are separately traversed based on BFS, a level order of the query graph Q1 and a level order of the query graph Q2 may be obtained. In the query graph Q1, the root node $u_{13}$ is located at a first layer, and the other nodes are located at a second layer. In the query graph Q2, the root node $u_{23}$ is located at a first layer, and the other nodes are located at a second layer.

The matching apparatus 120 sorts nodes in the query graph based on the level order of the query graph Q1, to obtain a node matching plan $\{u_{13}, u_{11}, u_{12}, u_{14}, u_{15}\}$ of the query graph Q1. The matching apparatus 120 sorts nodes in the query graph based on the level order of the query graph Q2, to obtain a node matching plan $\{u_{23}, u_{21}, u_{22}, u_{24}\}$ of the query graph Q2.

Step 2: After configuring a node matching plan of each query graph, the matching apparatus 120 may obtain a task subgraph of each query graph from the data subgraph based on the node matching plan of each query graph.

For any query graph, the matching apparatus 120 may first obtain a seed node from the data subgraph based on a root node of the query graph. For any neighboring node of the root node, a label of at least one neighboring node of the seed node is the same as a label of the neighboring node of the root node. In other words, for a neighboring node that is of the root node and whose label is P, a label of at least one neighboring node of the seed node is also P. The seed node may be used as a $1^{st}$ node in the task subgraph.

Then, the matching apparatus 120 may traverse the nodes in the query graph based on a node sequence in the node matching plan, and each time a node in the query graph is traversed, determine, from the data graph, a node that is the same as the node in the query graph, and add the node to the task subgraph of the query graph. When all nodes in the query graph are traversed, a complete task subgraph may be generated. A node that is in the data graph and that is the same as the node in the query graph satisfies some or all of the following: a label of the node in the data graph is the same as a label of the node in the query graph, and a connection relationship between nodes in the data graph is the same as a connection relationship between nodes in the query graph (for example, a label of a neighboring node of the node is the same as a label of a neighboring node of a corresponding node in the query graph).

However, for a plurality of query graphs in the group of query graphs (the plurality of query graphs may be all or some query graphs in the group of query graphs), a same seed node may be obtained from the data subgraph. In this case, one task subgraph may be generated for the plurality of query graphs. For a manner of generating the task subgraph, refer to the foregoing descriptions. The task subgraph may include nodes in the plurality of query graphs, and the task submap is a task submap corresponding to the plurality of query graphs.

It should be noted that, for any query graph, the matching apparatus 120 may obtain a plurality of seed nodes from the data subgraph. For each seed node, the matching apparatus 120 traverses the nodes in the query graph based on the node sequence in the node matching plan, determines, from the data graph, a node that is the same as the node in the query graph, and adds the node to the task subgraph of the query graph. In other words, one seed node may generate one task subgraph. After obtaining a plurality of seed nodes from the data subgraph, the matching apparatus 120 may further determine a neighboring node set of each seed node, to further reduce a quantity of task subgraphs and reduce a workload of subsequent subgraph matching. If seed nodes whose neighboring node sets overlap exist in the plurality of seed nodes, the seed nodes whose neighboring node sets overlap may be comprehensively considered. For example, the seed nodes whose neighboring node sets overlap may be added to a same task subgraph. Seed nodes whose neighboring node sets are completely different may be separately considered. For example, the seed nodes whose neighboring node sets are completely different are separately added to different task subgraphs.

Step 3: After obtaining the task subgraph of each query graph, for any query graph, the matching apparatus 120 may first match a task subgraph of the query graph with a common subgraph of the group of query graphs. The common subgraph of the group of query graphs is a common part of all query graphs in the group of query graphs.

A manner in which the matching apparatus 120 matches the task subgraph of the query graph with the common subgraph of the group of query graphs is similar to a manner of a single-subgraph query. To be specific, whether the task subgraph includes a node of the common subgraph is determined, and whether a connection relationship between nodes in the task subgraph is the same as a connection relationship between same nodes in the common subgraph is determined.

If matching between the task subgraph of the query graph and the common subgraph of the group of query graphs fails, it indicates that the task subgraph cannot match the common subgraph. Further, the task subgraph cannot match the query graph. A matching result of the query graph is that matching fails, and a subgraph that matches the query graph does not exist in the data graph. If matching between the task subgraph of the query graph and the common subgraph of the group of query graphs succeeds, it indicates that the task subgraph may match the query graph. The matching apparatus 120 may continue to perform step 4.

Step 4: The matching apparatus 120 matches the task subgraph of the query graph with a part of the query graph other than the common subgraph.

When matching the task subgraph of the query graph with the part of the query graph other than the common subgraph, the matching apparatus 120 may perform matching in the manner of single-subgraph matching.

If a plurality of query graphs whose task subgraph is successfully matched with the common subgraph exist in the group of query graphs, for example, the task subgraph is a task subgraph to which the plurality of query graphs jointly correspond, the matching apparatus 120 may comprehensively consider the plurality of query graphs whose task subgraph is successfully matched with the common subgraph. The matching apparatus 120 may alternatively continue to preprocess parts of the plurality of query graphs other than the common subgraph, to search for a common candidate node of the plurality of query graphs. After the common candidate node is determined, the common candidate node may be first matched with the task subgraph of the plurality of query graphs. After matching succeeds, for a remaining part of any query graph other than the common subgraph and the common candidate node, the matching apparatus 120 may match the task subgraph of the query graph with the remaining part of the query graph (a matching manner may be a single-subgraph matching manner).

For example, the matching apparatus 120 may determine the common candidate node based on node matching plans of the plurality of query graphs. The common candidate node is a same node in the node matching plans of the plurality of query graphs. If there are a plurality of common candidate nodes, the plurality of common candidate nodes are nodes with a same ranking in the node matching plans of the plurality of query graphs.

Figure 7:
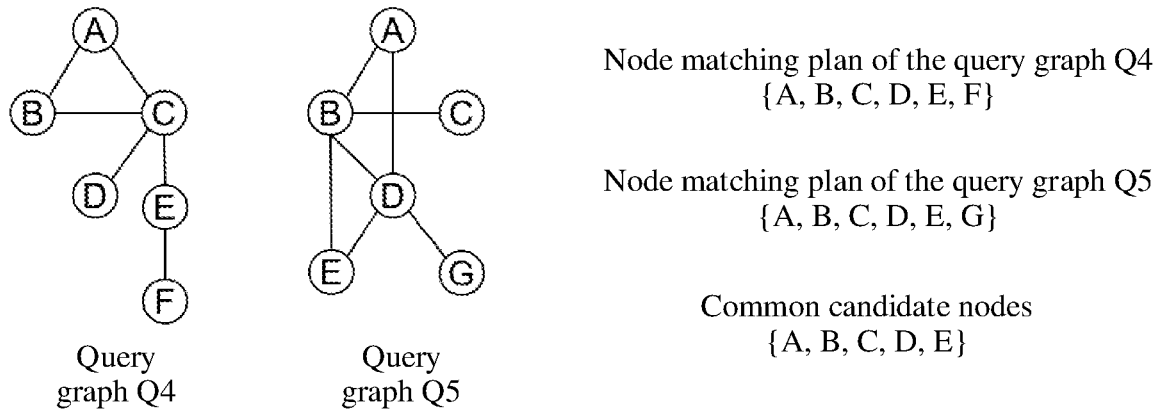
FIG. 7 is a schematic diagram of determining a common candidate node according to this application.

FIG. 7 is a schematic diagram of determining a common candidate node. FIG. 7 shows two query graphs. The two query graphs are a query graph Q4 and a query graph Q5. In FIG. 7, labels of nodes in the query graph Q4 and the query graph Q5 are marked. For the query graph Q4, a node matching plan of the query graph Q4 is {A, B, C, D, E, F}, and for the query graph Q5, a node matching plan of the query graph Q5 is {A, B, C, D, E, G}. The node matching plan {A, B, C, D, E, F} and the node matching plan {A, B, C, D, E, G} have a same part, that is, {A, B, C, D, E}. Nodes whose labels are A, B, C, D, and E are common candidate nodes of the query graph Q4 and the query graph Q5. These common candidate nodes are nodes included in both the query graph Q4 and the query graph Q5. In addition, a sorting manner of these common candidate nodes in the node matching plan of the query graph Q4 is the same as a sorting manner of these common candidate nodes in the node matching plan of the query graph Q5.

After determining the common candidate node, the matching apparatus 120 determines a node that may be matched with the common candidate node in the task subgraph of the plurality of query graphs. The node that may be matched means that a label of the node is the same as a label of the common candidate node, and a connection relationship of the node in the task subgraph (the connection relationship of the node in the task subgraph may be understood as a neighboring node of the node) is the same as a connection relationship of the common candidate node in the query graph. That the connection relationship of the node in the task subgraph is the same as the connection relationship of the common candidate node in the query graph means that at least one neighboring node of the node in the task subgraph has a same label as any neighboring node of the common candidate node in the query graph.

Because the common candidate node is a node included in all of the plurality of query graphs, for any common candidate node, the node that may be matched and that is determined by the matching apparatus 120 in the task subgraph of the plurality of query graphs may match the common candidate node in all the query graphs, or may match the common candidate node in only some of the query graphs. Therefore, the matching apparatus 120 may mark the node that may be matched and that is determined in the task subgraph of the plurality of query graphs, and mark the node as satisfying a constraint of one or more query graphs.

The query graph Q4 and the query graph Q5 shown in FIG. 7 are used as an example for description. Nodes whose labels are A, B, C, D, and E are common candidate nodes of the query graph Q4 and the query graph Q5. Nodes whose labels are A, B, and C are nodes in a common subgraph of the query graph Q4 and the query graph Q5. A point that matches the nodes whose labels are A, B, and C may be found from a task subgraph of the query graph Q4 and the query graph Q5. Nodes whose labels are D and E are not nodes in the common subgraph of the query graph Q4 and the query graph Q5. Whether the nodes whose labels are D and E satisfy the constraint of the query graph Q4 and/or the query graph Q5 in the task subgraph of the query graph Q4 and the query graph Q5 needs to be further determined.

For a node whose label is D, the matching apparatus 120 may determine whether a node that may be matched exists in the task subgraph of the query graph Q4, that is, whether a node that has a same label and a same connection relationship exists (that is, determine whether a node whose label is C exists in a neighboring node of the node whose label is D in the task subgraph of the query graph Q4). If the node exists, the node is marked as satisfying the constraint of the query graph Q4. Similarly, the matching apparatus may also determine whether a node that may be matched exists in the task subgraph of the query graph Q5. If the node exists, the node is marked as satisfying the constraint of the query graph Q5.

For a node whose label is E, the matching apparatus 120 may determine whether a node that may be matched exists in the task subgraph of the query graph Q4, that is, whether a node that has a same label and a same connection relationship exists (that is, determine whether a node whose label is C exists in a neighboring node of the node whose label is D in the task subgraph of the query graph Q4). If the node exists, the node is marked as satisfying the constraint of the query graph Q4. Similarly, the matching apparatus 120 may also determine whether a node that may be matched exists in the task subgraph of the query graph Q5. If the node exists, the node is marked as satisfying the constraint of the query graph Q5.

After determining the nodes that may be matched with the common candidate node in the task subgraph of the plurality of query graphs, the matching apparatus 120 may perform backtracking search matching on the plurality of query graphs.

For example, the matching apparatus 120 may first add a node in the common subgraph to a matching queue, traverse all common candidate nodes to search for a common candidate node that satisfies a constraint of the plurality of query graphs, and add, to the matching queue, the common candidate node that satisfies the constraint. After the common candidate node is traversed, single-subgraph matching is performed on a remaining part of each query graph other than the matching queue.

Figure 8:
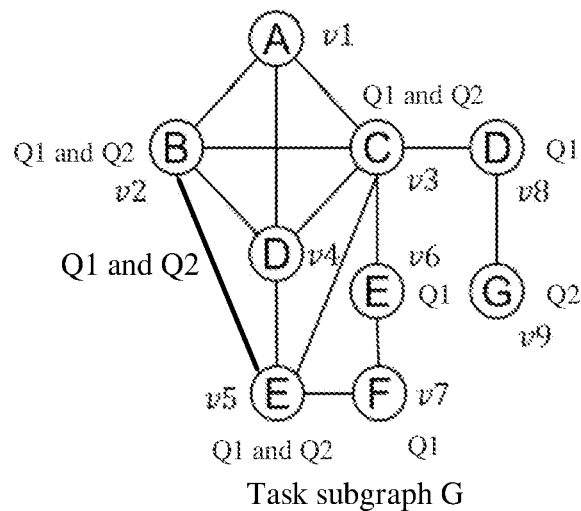
FIG. 8 is a schematic diagram of marking a task subgraph according to this application.

As shown in FIG. 8, query graphs are the query graph Q4 and the query graph Q5. In a task subgraph G (the task subgraph G is a task subgraph to which the query graph Q4 and the query graph Q5 jointly correspond), a node that may be matched with each common candidate node is marked. For example, in the task subgraph G, a node $v_4$ is marked as satisfying the constraint of the query graph Q4 and the query graph Q5, and a node $v_6$ is marked as satisfying the constraint of the query graph Q4, the node $v_5$ is marked as satisfying the constraint of query graph Q4 and the query graph Q5. When backtracking search matching is performed on the query graph Q4 and the query graph Q5, nodes $\{v_1, v_2, v_3\}$ in the task subgraph G that match the common subgraph are put into the matching queue, a node $v_4$ that is in the task subgraph and that satisfies the constraints of both the query graph Q4 and the query graph Q5 is checked, and the node $v_4$ is separately matched with the query graph Q4 and the query graph Q5. If matching between the node $v_4$ and each of the query graph Q4 and the query graph Q5 succeeds, the node $v_4$ is added to the matching queue, and the matching queue changes to $\{v_1, v_2, v_3, v_4\}$. Similarly, $v_5$ continues to be checked, and if matching between $v_5$ is and each of the query graph Q4 and the query graph Q5 succeeds, the node $v_5$ is added to the matching queue, and the matching queue changes to $\{v_1, v_2, v_3, v_4, v_5\}$. When no node satisfies the constraint of both the graph Q4 and the query graph Q5, for matching of the query graph Q4, a subsequent matching process is degraded to single-subgraph matching of a remaining part (other than the matching queue) of the query graph Q4. The matching apparatus 120 checks a node $v_7$ in the task subgraph, and matches the node $v_7$ with the remaining part of the query graph Q4, to obtain a matching result $\{v_1, v_2, v_3, v_4, v_5, v_7\}$ of the query graph Q4.

For matching of the query graph Q5, a subsequent matching process is degraded to single-subgraph matching of a remaining part (other than the matching queue) of the query graph Q5. The matching apparatus 120 checks a node in the task subgraph, and finds no node that matches the remaining part of the query graph Q5. Matching fails.

Based on a matching process of the common candidate node, matching needs to be performed only once for the common candidate nodes $\{v_4, v_5\}$, to reduce repeated matching work, and increase subgraph matching efficiency.

Step 306: The matching apparatus 120 feeds back a matching result of the matching task to the control apparatus 110.

After completing matching of the group of query graphs, the matching apparatus 120 may feed back a final matching result to the control apparatus 110. In the matching apparatus 120, a matching result of each query graph may be stored by using a hash table, and a key-value pair is used in the hash table to represent the matching result of the query graph. Herein, key indicates an identifier of the query graph, and value indicates the matching result of the query graph.

The matching apparatus 120 may aggregate matching results of all query graphs in the group of query graphs into the hash table, and feed back the hash table to the control apparatus 110.

Step 308: The control apparatus 110 summarizes matching results fed back by all the matching apparatuses 120.

When receiving the matching results fed back by the matching apparatuses 120, the control apparatus 110 may summarize the matching results of the matching results, and feed back the combined matching results to the user through the client.

After receiving a hash table that is from each matching apparatus 120 and that represents matching results of each group of query graphs, the control apparatus 110 may aggregate a plurality of hash tables into one hash table, and send the aggregated hash table to the client. After receiving the hash table, the client may present the hash table to the user.

Figure 9:
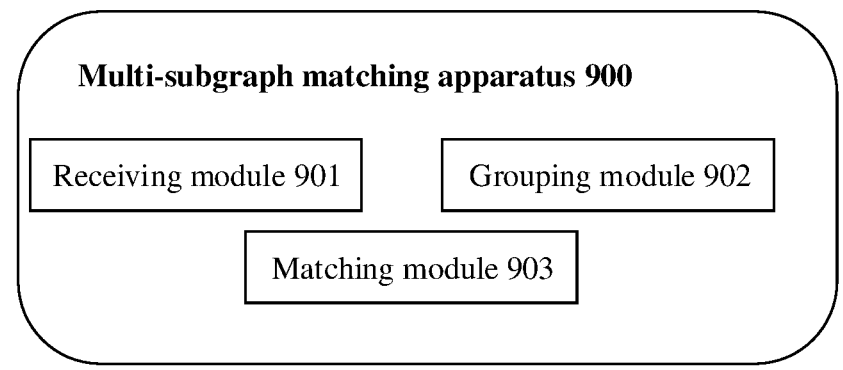
FIG. 9 is a schematic diagram of a structure of a multi-subgraph matching apparatus according to this application.

Based on a same inventive concept as the method embodiment, an embodiment of this application further provides a multi-subgraph matching apparatus. The multi-subgraph matching apparatus is configured to perform the method performed by the control apparatus 110 and the matching apparatus 120 in the method embodiment. As shown in FIG. 9, the multi-subgraph matching apparatus 900 includes a receiving module 901, a grouping module 902, and a matching module 903. For example, in the multi-subgraph matching apparatus 900, a connection is established between the modules by using a communication path.

The receiving module 901 is configured to receive a plurality of query graphs, where each of the plurality of query graphs represents a plurality of nodes and a connection relationship between the nodes.

The grouping module 902 is configured to group the plurality of query graphs based on a hash value of each query graph, to generate a plurality of groups of query graphs, where a plurality of query graphs whose hash values fall within a same value range belong to a same group.

The matching module 903 is configured to respectively match the plurality of groups of query graphs with a data graph in parallel, to obtain matching results.

In an embodiment, query costs of all of the plurality of groups of query graphs fall within a same range, and the query cost indicates a workload consumed when matching is performed on a plurality of query graphs that belong to a same group.

In an embodiment, the matching module 903 may divide the data graph, to generate a plurality of data subgraphs; and execute a plurality of matching tasks in parallel, where each matching task is used to match one of the plurality of data subgraphs with one of the plurality of groups of query graphs.

In an embodiment, the plurality of matching tasks include a first matching task, the first matching task is used to match a first data subgraph with a first group of query graphs in the plurality of groups of query graphs, and the first data subgraph includes nodes of all query graphs in the first group of query graphs.

In an embodiment, when executing the first matching task, the matching module 903 may determine a task subgraph of each query graph in the first group of query graphs from the first data subgraph, where the task subgraph of the query graph includes all nodes of the query graph; match the task subgraph of each query graph with a common subgraph, where the common subgraph is a common part included in each query graph in the first group of query graphs; and when matching between a task subgraph of any query graph and the common subgraph succeeds, match the task subgraph of the query graph with a part of the query graph other than the common subgraph, to obtain a matching result between the task subgraph of the query graph and the query graph.

In an embodiment, if matching between the task subgraph of the query graph and the common subgraph fails, the matching module 903 may further determine that a subgraph that matches the query graph does not exist in the first data subgraph.

In an embodiment, the hash value of each query graph is obtained based on a local hash algorithm LSH.

Figure 10:
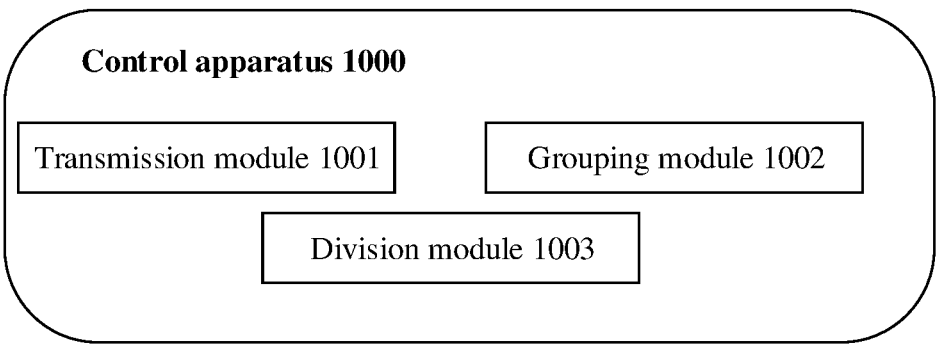
FIG. 10 is a schematic diagram of a structure of a control apparatus according to this application.

Based on a same inventive concept as the method embodiment, an embodiment of this application further provides a control apparatus. The control apparatus is configured to perform the method performed by the control apparatus 110 in the method embodiment. As shown in FIG. 10, the control apparatus 1000 includes a transmission module 1001 and a grouping module 1002. Optionally, the control apparatus 1000 further includes a division module 1003. For example, in the control apparatus 1000, a connection is established between the modules by using a communication path.

The transmission module 1001 is configured to receive a plurality of query graphs, where each of the plurality of query graphs represents a plurality of nodes and a connection relationship between the nodes.

The grouping module 1002 is configured to group the plurality of query graphs based on a hash value of each query graph, to generate a plurality of groups of query graphs, where a plurality of query graphs whose hash values fall within a same value range belong to a same group.

The transmission module 1001 is further configured to send the plurality of groups of query graphs to a plurality of matching apparatuses.

In an embodiment, the division module 1003 may divide the data graph, to generate a plurality of data subgraphs; and the transmission module 1001 may send the plurality of data subgraphs to the plurality of matching apparatuses. One data subgraph is sent to each matching apparatus.

In an embodiment, query costs of all of the plurality of groups of query graphs fall within a same range, and the query cost indicates a workload consumed when matching is performed on a plurality of query graphs that belong to a same group.

In an embodiment, the hash value of each query graph is obtained based on a local hash algorithm LSH.

Figure 11:
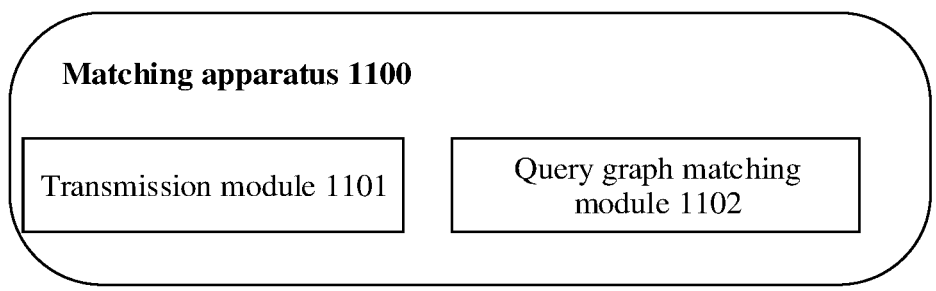
FIG. 11 is a schematic diagram of a structure of a matching apparatus according to this application.

Based on a same inventive concept as the method embodiment, an embodiment of this application further provides a matching apparatus. The matching apparatus is configured to perform the method performed by the matching apparatus 120 in the method embodiment. As shown in FIG. 11, a matching apparatus 1100 includes a transmission module 1101 and a query graph matching module 1102. Specifically, in the matching apparatus 1100, a connection is established between the modules by using a communication path.

The transmission module 1101 is configured to receive a plurality of groups of query graphs.

The query graph matching module 1102 is configured to match one of the plurality of groups of query graphs with a data graph in parallel, to obtain matching results.

In an embodiment, query costs of all of the plurality of groups of query graphs fall within a same range, and the query cost indicates a workload consumed when matching is performed on a plurality of query graphs that belong to a same group.

In an embodiment, the transmission module 1101 is further configured to receive a data subgraph. When matching one of the plurality of groups of query graphs with the data graph in parallel, the query graph matching module 1102 may match the received data subgraph with one of the plurality of groups of query graphs.

In an embodiment, the data subgraph obtained by the query graph matching module 1102 is a first data subgraph, and a group of query graphs that need to be matched is a first group of query graphs. The first data subgraph includes nodes of all query graphs in the first group of query graphs.

In an embodiment, when matching the first group of query graphs with the first data subgraph in parallel, the query graph matching module 1102 may first determine a task subgraph of each query graph in the first group of query graphs from the first data subgraph. The task subgraph of the query graph includes all nodes of the query graph. Then, the task subgraph of each query graph is matched with a common subgraph. The common subgraph is a common part included in each query graph in the first group of query graphs. When matching between a task subgraph of any query graph and the common subgraph succeeds, the task subgraph of the query graph is matched with a part of the query graph other than the common subgraph, to obtain a matching result between the task subgraph of the query graph and the query graph.

In an embodiment, when determining that matching between the task subgraph of the query graph and the common subgraph fails, the query graph matching module 1102 may determine that a subgraph that matches the query graph does not exist in the first data subgraph.

Division into the modules in embodiments of this application is an example, is merely division into logical functions, and may be other division in an actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

When the integrated module is implemented in the form of a software function module and sold or used as an independent product, the integrated module may be stored in a computer-readable storage medium. Based on such an understanding, the technical solutions of this application essentially or the part contributing to the conventional technology, or all or a part of the technical solutions may be embodied in a form of a software product. The computer software product is stored in a storage medium, and includes several instructions for instructing a terminal device (which may be a personal computer, a mobile phone, a network device, or the like) or a processor to perform all or some steps of the methods in embodiments of this application. The foregoing storage medium includes any medium that can store program code such as a USB flash drive, a removable hard disk, a read-only memory (ROM), a random access memory (RAM), a magnetic disk, or an optical disc.

Figure 12:
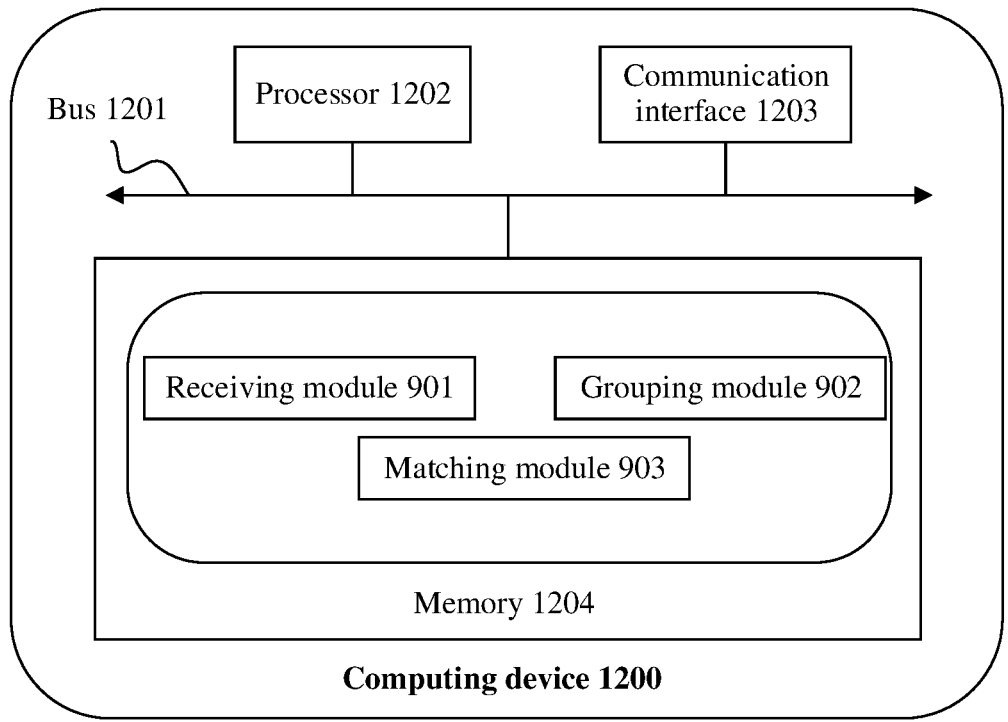
FIG. 12 and FIG. 13 each are a schematic diagram of a structure of a computing device according to this application.

This application further provides a computing device 1200 shown in FIG. 12. The computing device 1200 includes a bus 1201, a processor 1202, a communication interface 1203, and a memory 1204. The processor 1202, the memory 1204, and the communication interface 1203 communicate with each other through the bus 1201.

The processor 1202 may be a central processing unit (CPU). The memory 1204 may include a volatile memory, for example, a random access memory (RAM). The memory 1204 may alternatively include a nonvolatile memory (nonvolatile memory), for example, a read-only memory (ROM), a flash memory, an HDD, or an SSD. The memory stores executable code, and the processor 1202 performs the method described in FIG. 3. The memory 1204 may further include software modules (for example, a plurality of modules in the multi-subgraph matching apparatus 900, a plurality of modules in the control apparatus 1000, or a plurality of modules in the matching apparatus 1100) required for another running process such as an operating system. The operating system may be Linux™, Unix™, Windows™, or the like. In FIG. 12, only a plurality of modules in the multi-subgraph matching apparatus 900 are drawn as an example.

This application further provides a computing device system. The computing device system includes at least one computing device 1300 shown in FIG. 13. The computing device 1300 includes a bus 1301, a processor 1302, a communication interface 1303, and a memory 1304. The processor 1302, the memory 1304, and the communication interface 1303 communicate with each other through the bus 1301. The at least one computing device 1300 in the computing device system communicates with each other through a communication path.

The processor 1302 may be a CPU. The memory 1304 may include a volatile memory, for example, a random access memory. The memory 1304 may alternatively include a nonvolatile memory, for example, a read-only memory, a flash memory, an HDD, or an SSD. The memory 1304 stores executable code, and the processor 1302 executes the executable code, to perform any part or all of the method described in FIG. 3. The memory may further include a software module required for another running process such as an operating system. The operating system may be Linux™, Unix™, Windows™, or the like.

The at least one computing device 1300 in the computing device system establishes communication with each other through a communication network, and any one or more modules in the multi-subgraph matching apparatus 900 may run on each computing device 1300.

The at least one computing device 1300 in the computing device system establishes communication with each other through the communication network, and any one or more modules in the control apparatus 1000 may run on each computing device 1300.

Figure 13:
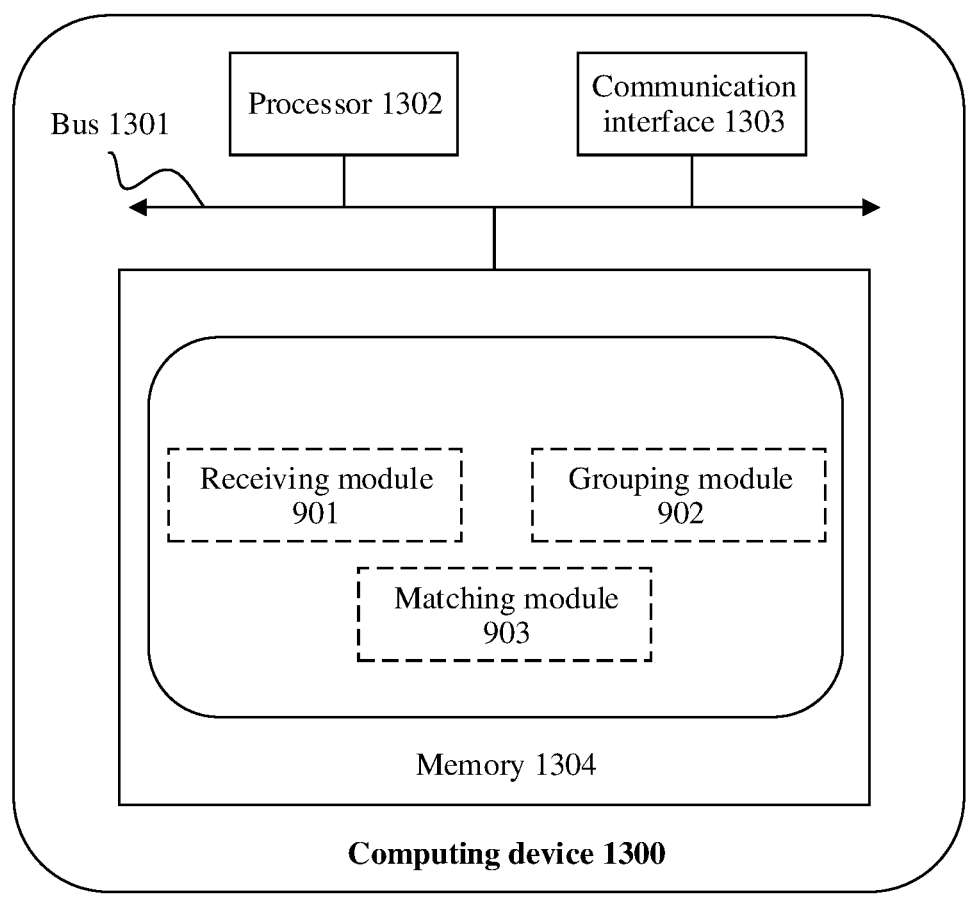

The at least one computing device 1300 in the computing device system establishes communication with each other through the communication network, and any one or more modules in a plurality of matching apparatuses 1100 may run on each computing device 1300. In FIG. 13, only a plurality of modules in the multi-subgraph matching apparatus 900 are drawn as an example.

The descriptions of procedures corresponding to the foregoing accompanying drawings have respective focuses. For a part that is not described in detail in a procedure, refer to related descriptions of another procedure.

All or some of the foregoing embodiments may be implemented by software, hardware, firmware, or any combination thereof. When the software is used to implement embodiments, all or a part of the embodiments may be implemented in a form of a computing device program product. The computing device program product includes computer program instructions. When the computing device program instructions are loaded and executed on a computer, all or some procedures or functions in FIG. 3 in embodiments of the present invention are generated.

The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) man-

What is claimed is:

1. A multi-subgraph matching method, wherein the method comprises:
   receiving a plurality of query graphs, wherein each of the plurality of query graphs represents a plurality of nodes and a connection relationship between the nodes;
   grouping the plurality of query graphs based on a hash value of each query graph, to generate a plurality of groups of query graphs, wherein a plurality of query graphs having hash values that fall within a same value range belong to a same group; and
   respectively matching the plurality of groups of query graphs with a data graph in parallel, to obtain matching results, by:
      dividing the data graph, to generate a plurality of data subgraphs; and
      executing a plurality of matching tasks in parallel, wherein each of the plurality of matching tasks is used to match one of the plurality of data subgraphs with one of the plurality of groups of query graphs.

2. The method according to claim 1, wherein query costs of all of the plurality of groups of query graphs fall within a same range, and a query cost indicates a workload consumed when matching is performed on a plurality of query graphs that belong to a same group.

3. The method according to claim 1, wherein the plurality of matching tasks comprise a first matching task, the first matching task is used to match a first data subgraph with a first group of query graphs in the plurality of groups of query graphs, and the first data subgraph comprises nodes of all query graphs in the first group of query graphs.

4. The method according to claim 1, wherein executing the first matching task comprises:
   determining a task subgraph of each query graph in the first group of query graphs from the first data subgraph, wherein the task subgraph of the query graph comprises all nodes of the query graph;
   matching the task subgraph of each query graph with a common subgraph, wherein the common subgraph is a common part comprised in each query graph in the first group of query graphs; and
   based on a matching between a task subgraph of any query graph and the common subgraph succeeding, matching the task subgraph of the query graph with a part of the query graph other than the common subgraph, to obtain a matching result between the task subgraph of the query graph and the query graph.

5. The method according to claim 4, wherein the method further comprises:
   based on the matching between the task subgraph of the query graph and the common subgraph failing, determining that a subgraph that matches the query graph does not exist in the first data subgraph.

6. The method according to claim 1, wherein the hash value of each query graph is obtained based on a local hash algorithm (LSH).

7. A multi-subgraph matching apparatus, wherein the apparatus comprises:
   a processor, configured to:
   receive a plurality of query graphs, wherein each of the plurality of query graphs represents a plurality of nodes and a connection relationship between the nodes;
   group the plurality of query graphs based on a hash value of each query graph, to generate a plurality of groups of query graphs, wherein a plurality of query graphs having hash values that fall within a same value range belong to a same group; and
   respectively match the plurality of groups of query graphs with a data graph in parallel, to obtain matching results, wherein that the processor is configured to respectively match the plurality of groups of query graphs with a data graph in parallel, to obtain matching results includes that the processor is configured to:
   divide the data graph, to generate a plurality of data subgraphs; and
   execute a plurality of matching tasks in parallel, wherein each of the plurality of matching tasks is used to match one of the plurality of data subgraphs with one of the plurality of groups of query graphs.

8. The apparatus according to claim 7, wherein query costs of all of the plurality of groups of query graphs fall within a same range, and a query cost indicates a workload consumed when matching is performed on a plurality of query graphs that belong to a same group.

9. The apparatus according to claim 7, wherein the plurality of matching tasks comprise a first matching task, the first matching task is used to match a first data subgraph with a first group of query graphs in the plurality of groups of query graphs, and the first data subgraph comprises nodes of all query graphs in the first group of query graphs.

10. The apparatus according to claim 7, wherein that the processor executes the first matching task comprises:
    determining a task subgraph of each query graph in the first group of query graphs from the first data subgraph, wherein the task subgraph of the query graph comprises all nodes of the query graph;
    matching the task subgraph of each query graph with a common subgraph, wherein the common subgraph is a common part comprised in each query graph in the first group of query graphs; and
    based on a matching between a task subgraph of any query graph and the common subgraph succeeding, matching the task subgraph of the query graph with a part of the query graph other than the common subgraph, to obtain a matching result between the task subgraph of the query graph and the query graph.

11. The apparatus according to claim 10, wherein the processor is further configured to:
    based on the matching between the task subgraph of the query graph and the common subgraph failing, determining that a subgraph that matches the query graph does not exist in the first data subgraph.

12. The apparatus according to claim 7, wherein the hash value of each query graph is obtained based on a local hash algorithm (LSH).

13. A computing device, wherein the computing device comprises a processor and a memory;
    the memory is configured to store computer program instructions; and the processor invokes the computer program instructions in the memory, to cause the computing device to perform a method including:

receiving a plurality of query graphs, wherein each of the plurality of query graphs represents a plurality of nodes and a connection relationship between the nodes;

grouping the plurality of query graphs based on a hash value of each query graph, to generate a plurality of groups of query graphs, wherein a plurality of query graphs having hash values that fall within a same value range belong to a same group; and respectively matching the plurality of groups of query graphs with a data graph in parallel, to obtain matching results, by:

dividing the data graph, to generate a plurality of data subgraphs; and executing a plurality of matching tasks in parallel, wherein each of the plurality of matching tasks is used to match one of the plurality of data subgraphs with one of the plurality of groups of query graphs.

14. The computing device according to claim 13, wherein query costs of all of the plurality of groups of query graphs fall within a same range, and a query cost indicates a workload consumed when matching is performed on a plurality of query graphs that belong to a same group.

15. The computing device according to claim 13, wherein the plurality of matching tasks comprise a first matching task, the first matching task is used to match a first data subgraph with a first group of query graphs in the plurality of groups of query graphs, and the first data subgraph comprises nodes of all query graphs in the first group of query graphs.

16. The computing device according to claim 13, wherein executing the first matching task comprises:

determining a task subgraph of each query graph in the first group of query graphs from the first data subgraph, wherein the task subgraph of the query graph comprises all nodes of the query graph;

matching the task subgraph of each query graph with a common subgraph, wherein the common subgraph is a common part comprised in each query graph in the first group of query graphs; and based on a matching between a task subgraph of any query graph and the common subgraph succeeding, matching the task subgraph of the query graph with a part of the query graph other than the common subgraph, to obtain a matching result between the task subgraph of the query graph and the query graph.

17. The computing device according to claim 16, wherein the method further comprises:

based on the matching between the task subgraph of the query graph and the common subgraph failing, determining that a subgraph that matches the query graph does not exist in the first data subgraph.

* * * * *